(12) United States Patent
Beckmann et al.

(10) Patent No.: US 10,742,443 B2
(45) Date of Patent: Aug. 11, 2020

(54) METHOD FOR TRANSMITTING MESSAGES IN A DATA BUS SYSTEM, TRANSCEIVER AND ELECTRONIC CONTROL UNIT FOR A MOTOR VEHICLE

(71) Applicants: Continental Teves AG & Co. oHG, Frankfurt (DE); NXP USA Inc., Austin, TX (US)

(72) Inventors: Tobias Beckmann, Eschborn (DE); Ireneusz Janiszewski, Mühltal (DE); Claas Cornelius, Hannover (DE); Pierre Turpin, Toulouse (FR); Eugeny Alexandrovich Kulkov, Tula (RU); Robert Gach, Seysses (FR); Sergey Sergeevich Ryabchenkov, Moscow (RU)

(73) Assignees: Continental Teves AG & Co. oHG (DE); NXP USA Inc., Austin, TX (US)

( * ) Notice: Subject to any disclaimer, the term of this patent is extended or adjusted under 35 U.S.C. 154(b) by 0 days.

(21) Appl. No.: 15/558,350

(22) PCT Filed: Mar. 26, 2015

(86) PCT No.: PCT/IB2015/000748
§ 371 (c)(1),
(2) Date: Sep. 14, 2017

(87) PCT Pub. No.: WO2016/151353
PCT Pub. Date: Sep. 29, 2016

(65) Prior Publication Data
US 2018/0069723 A1 Mar. 8, 2018

(51) Int. Cl.
*H04L 12/40* (2006.01)

(52) U.S. Cl.
CPC .... *H04L 12/4013* (2013.01); *H04L 12/40169* (2013.01); *H04L 2012/40215* (2013.01); *H04L 2012/40273* (2013.01)

(58) Field of Classification Search
CPC .......... H04L 12/4013; H04L 12/40169; H04L 2012/40273; H04L 2012/40215
(Continued)

(56) References Cited

U.S. PATENT DOCUMENTS

2014/0156887 A1* 6/2014 Hartwich ............ G06F 13/4282
710/105
2014/0156893 A1* 6/2014 Monroe ................ G06F 13/372
710/117

(Continued)

OTHER PUBLICATIONS

Title: CAN with Flexible Data-Rate; Inventor: Florian Hartwich, Robert Bosch GmbH; iCC 2012; (Year: 2012).*

(Continued)

*Primary Examiner* — Hassan A Phillips
*Assistant Examiner* — Mohammed S Chowdhury
(74) *Attorney, Agent, or Firm* — RatnerPrestia

(57) ABSTRACT

A method for transmitting messages in a data bus system, wherein the messages can be transmitted in the form of data frames by a data bus and a data frame that is to be sent by a bus subscriber is checked for a piece of changeover information, which method is furthermore distinguished in that changeover of the rise time and/or edge shape of edges of bit pulses of the data frame that is to be sent is performed on the basis of the presence of a defined value of the piece of changeover information. In addition, a corresponding transceiver and to an electronic control unit is disclosed.

21 Claims, 1 Drawing Sheet

(58) Field of Classification Search
USPC .......................................................... 370/468
See application file for complete search history.

(56) References Cited

U.S. PATENT DOCUMENTS

| | | | | |
|---|---|---|---|---|
| 2014/0241414 A1* | 8/2014 | Reidl | ................... | H04L 25/4902 |
| | | | | 375/238 |
| 2014/0337549 A1* | 11/2014 | Hartwich | ............ | H04L 12/4013 |
| | | | | 710/106 |
| 2015/0339254 A1* | 11/2015 | Hartwich | .............. | H04L 1/0083 |
| | | | | 710/106 |
| 2016/0234038 A1* | 8/2016 | Mounier | ........... | H04L 12/40032 |
| 2016/0254924 A1* | 9/2016 | Hartwich | ................ | H04L 69/10 |
| | | | | 370/468 |
| 2017/0063571 A1* | 3/2017 | Hehemann | ............ | H04L 12/413 |

OTHER PUBLICATIONS

Hartwich, F., "CAN with flexible data-rate," Mar. 14, 2012, pp. 14-1-14-9, Proceedings of the 13th International CAN Conference, XP055133740, Retrieved from the Internet: http://www.can-cia.org/fileadmin/cia/files/icc/13/hartwich.pdf [retrieved on Aug. 7, 2014].
International Search Report and Written Opinion for International Application No. PCT/IB2015/000748, dated Nov. 18, 2015, 9 pages 2015.
Korean Office Action for Korean Application No. 10-2017-7027138, dated Nov. 1, 2018, with translation, 10 pages.
Chinese Office Action for Chinese Application No. 201580078261.8, dated Nov. 21, 2019 with partial translation, 12 pages.

* cited by examiner

METHOD FOR TRANSMITTING MESSAGES IN A DATA BUS SYSTEM, TRANSCEIVER AND ELECTRONIC CONTROL UNIT FOR A MOTOR VEHICLE

CROSS REFERENCE TO RELATED APPLICATIONS

This application is the U.S. National Phase Application of PCT International Application No. PCT/IB2015/000748 filed Mar. 26, 2015, the contents of such application being incorporated by reference herein.

FIELD OF THE INVENTION

The present invention relates to a method for transmitting messages in a data bus system to a transceiver for a bus subscriber of a data bus system and to a corresponding electronic control unit for a motor vehicle.

BACKGROUND OF THE INVENTION

Data bus systems are used in many diverse technical areas. Examples are automotive and aviation engineering, where particularly the communication of electronic control units (ECU) is realized using bus systems, such as CAN bus. If messages are sent from one bus subscriber to all further bus subscribers in a bus system, this is referred to as what is known as a broadcast method. If this involves the data bus operating without defined time windows in which a particular bus subscriber can send a message, the sending processes of the bus subscribers are effected at arbitrary instants, but particularly when the data bus is not being used by a transmission process that is already taking place. In the case of a CAN data bus, the messages are transmitted in the form of data frames. In order to handle the growing communication with an extended bandwidth that accompanies an increasing number of applications, the CAN2.0B protocol was taken as a basis for developing the protocol CAN-FD ("CAN with Flexible Data Rate" specification version 1.0 dated 17 Apr. 2012), which is incorporated by reference, which allows higher data rates and more useful data per data frame. The precise structure of a CAN-FD data frame can likewise be gathered from this specification.

In this case, CAN-FD shares the same physical level with the CAN2.0B protocol, but the formats of the data frames are different. A CAN-FD data frame additionally comprises two control bits, the first control bit allowing data frames of extended length and the second control bit allowing changeover to a faster data rate. The control bits can be used to prescribe both properties independently of one another. CAN-FD can therefore be used to transmit a greater volume of data per unit time (payload). CAN-FD data frames are distinguished in that during the arbitration phase they have the same bit rate as data frames based on the CAN2.0B protocol. In the control field that adjoins the arbitration field of a data frame, the FDF bit (old name "r0") is used as an indication that a CAN-FD data frame is present. In the Bosch CAN-FD specification, the bit is denoted by EDL, which has not been developed further, however, and leads to IS011898-1, which currently forms the "Draft International Standard" If a CAN-FD data frame is involved, the FDE' bit is followed by a reserved bit ("res") and then by the BRS bit, which, on the basis of its value, prescribes changeover of the data rate within the CAN-FD data frame from the bit rate of the arbitration phase to the correspondingly preconfigured and higher bit rate of the data phase. This changeover would be effected as soon as the BRS bit appears. In this case, the definition in the specification is that a recessively detected BRS bit signals the changeover to the faster data rate.

CAN-FD is backward compatible with CAN2.0B, which means that data frames in CAN2.0B format and data frames in CAN-FD format can coexist in the same network. Provided that the CAN-data format is not being used, CAN2.0B data frames can be used in CAN-FD implementations.

CAN transceivers frequently need to meet defined demands on spurious emission, particularly on line-conducted radiated emission. For this purpose, the greatest possible mirror symmetry for the complementary levels on the CAN-H and CAN-L lines and rise times matched to the admissible radiated emission are implemented for transitions between dominant and recessive phases, the shortest possible rise time for the edges not being suitable for every application. For the transmission of CAN2.0B data frames, whose bit time (period for transmitting a bit) is limited to a minimum length of 1 μs, decoding of the bits is usually possible even in the case of a relatively shallow edge profile (relatively long rise time). In the case of decreasing bit times, for essentially constant rise and fall times, the bit pulses are rounded, since the rising and falling edges coincide. With very short bit times, it would not be possible for corresponding data frames to be decoded correctly, which means that despite an increase in the radiated emission the rise and fall times need to be chosen such that decoding is possible reliably.

If a receiving bus subscriber or transceiver recognizes erroneous transmission of a data frame, it sends an error message. This overwrites any communication on the CAN bus, with every further receiving bus subscriber recognizing the error message and rejecting the data frame received up to that instant. The sending bus subscriber terminates transmission as a result of recognition of the error message. Usually, every bus subscriber has a reception error counter (REC) that is incremented when an error message is sent. When a threshold value for a maximum number of error messages sent is exceeded, the bus subscriber sending said error messages is automatically isolated from the data bus. In addition, every bus subscriber comprises a transmission error counter (TEC) for failed transmissions, which is incremented when an error message is received while a data frame is being sent by the sending bus subscriber. Once the TEC has exceeded a previously defined threshold value for a maximum number of transmission attempts, the bus subscriber automatically isolates itself from the data bus, which prevents further transmission attempts. The error counters are decremented for messages sent or received without error.

CAN transceivers that are designed for partial networking (PN) comprise a decoder that can be used to concomitantly read and to decode the arriving CAN data frames in low-energy mode. At present, the specified requirement for decoding is limited to CAN2.0B data frames—that is to say not CAN-FD data frames. In the case of CAN-FD data frames, the bit times in the data phase may be so short that they cannot reliably be decoded correctly by the decoder of the bus subscribers (receivers) with that edge setting of the transmitter that is optimized for radiated emission. In this way, syntactically correct CAN-FD data frames sometimes incorrectly result in recognition of a supposedly erroneous data frame, sending of an error message and incrementing of the reception error counter (REC). This can additionally restrict the availability of affected systems if the error counter reaches an appropriate limit value.

SUMMARY OF THE INVENTION

An aspect of the invention provides a means that allows the realization of correct decoding of messages transmitted by means of data bus, a reduction in radiated emission and an increase in the availability of bus subscribers. In addition, the realization is intended to require as few modifications as possible.

An aspect of the invention relates to a method for transmitting messages in a data bus system, wherein the messages can be transmitted in the form of data frames by means of a data bus and a data frame that is to be sent by a bus subscriber is checked for a piece of changeover information, which method is distinguished in that changeover of the rise time and/or edge shape of edges of bit pulses of the data frame that is to be sent is performed on the basis of the presence of a defined value of the piece of changeover information. In this case the rise time describes particularly a period that is actually needed for changing a signal level between two defined limit values. Hence, the shortening of the rise time can be realized by means of an altered edge gradient and/or also by means of an appropriately adjusted edge shape, for example.

An advantage of an aspect of the invention is an increased measure of adaptability to suit application-specific demands, particularly in respect of spurious radiated emission and signal quality. This also allows the availability of bus subscribers on the data bus to be increased, which means that potentially safety-critical situations can be avoided.

In accordance with a particularly preferred embodiment, the changeover of the rise time and/or edge shape is performed within the data frame that is to be sent, such that various rise times and/or edge shapes can be realized in the data frame that is to be sent. The adaptability to suit application-specific demands is thereby improved further. When a value of the piece of changeover information is present that indicates the changeover that is to be performed, the rise time is preferably shortened and/or the edge shape is changed such that demands on a signal quality and/or radiated emission can be met at least in part.

The data frame that is to be sent expediently comprises a plurality of fields, wherein at least one data field is provided and, when a value of the piece of changeover information is recognized that indicates the changeover that is to be performed, the changeover for subsequent edges of bit pulses is effected at least for some of the data field.

This allows the radiated emission in the arbitration phase to be kept advantageously low and the signal quality of the data phase to be improved such that the receiving bus subscribers are able to perform correct decoding of the transmitted data. This means that, particularly in the data phase, there is no incrementing of the input error counter of the receiving bus subscribers.

In accordance with an advantageous embodiment of the invention, the changeover is performed by means of a transceiver associated with the bus subscriber. Preferably, the transceiver is a transceiver that can be operated using partial networking. Alternatively, transceivers that are not provided for partial networking can be equipped with corresponding functionality.

The changeover is preferably carried out during normal operation of the bus subscriber and/or of a transceiver associated with the bus subscriber and/or of an electronic control unit that the bus subscriber comprises. Normal operation is understood to mean a mode of operation in which the transceiver and/or an electronic control unit associated therewith or the corresponding bus subscriber with which the electronic control unit and also the transceiver and bus controller are associated is not in a low-energy mode and/or is at least in part in an activated state according to use. This makes it possible to avoid a controller associated with the transceiver being prescribed by means of a separate line, and also extensive modifications to existing transceivers.

The data frame that is to be sent is preferably checked for the piece of changeover information by means of a decoder associated with the transceiver, wherein the decoder outputs a control signal for changeover when a value of the piece of changeover information is recognized that indicates the changeover that is to be provided.

The realization preferably involves the use of the readback function of transceivers that is inherently in place, which is usually provided for the arbitration and, in adapted form, additionally performs the function according to the invention. Accordingly, the check on the data frame that is to be sent, which check is provided by means of the decoder, and the output of the control signal for changeover are carried out preferably during normal operation of the bus subscriber and/or of a transceiver associated with the bus subscriber and/or of an electronic control unit that the bus subscriber comprises.

The changeover is preferably effected together with commencement of a phase and/or a field with a relatively high clock rate for the data frame that is to be sent.

The piece of changeover information before a phase and/or a field with a relatively high clock rate is preferably represented by at least one bit of the data frame that is to be sent, this being particularly a bit for indicating a bit rate changeover (BRS bit) for a CAN-FD protocol. In this way, the value of the BRS bit of the CAN-FD protocol is used firstly for indicating the changeover of the bit rate (data rate) that is to be performed and at the same time for indicating the changeover of the rise time and/or edge shape. In accordance with an alternative preferred embodiment, it is possible to achieve decoupling of the changeover options, for example by using a bit of the data frame that is to be sent that does not relate to the bit rate.

Expediently, the rise time and/or edge shape of edges of bit pulses of the data frame that is to be sent is/are changed over again when conclusion of a data field or conclusion or commencement of a field subsequent to the data field is recognized. Preferably, changeover to essentially the same rise time as before the changeover as a result of the piece of changeover information is performed—in accordance with this refinement, a reverse changeover is therefore involved. The field that follows the data field in accordance with the CAN-FD protocol is a CRC field (check field), which means that the further changeover is preferably effected when conclusion of the data field or commencement or conclusion of the CRC field is recognized. The further changeover of the rise time and/or edge shape is preferably effected together with an end of a phase and/or a field with a relatively high clock rate for the data frame that is to be sent.

Whether and in what way the method according to an aspect of the invention is carried out by the transceiver or bus subscriber is preferably configurable, this being effected particularly by means of an SPI (serial peripheral bus) interface. Alternatively, provision is preferably made for the method according to the invention to be fundamentally activated, particularly when the reception path is used for reading in the currently sent data frame. Expediently, the activation of the method according to the invention may be tied to further conditions in parallel with the dependency on the presence of a defined value of the piece of changeover information. Hence, the edge modification can advantageously be activated on an application-specific basis, e.g. for particular modes of operation or bit rates.

An aspect of the invention additionally relates to a transceiver for a bus subscriber of a data bus system, which transceiver is designed to receive and send data frames via a data bus connecting the bus subscribers of the data bus system, wherein the transceiver can be used to carry out a check for a piece of changeover information on a data frame that is to be sent by said transceiver, and the transceiver is additionally designed to perform a changeover for a rise time and/or edge shape of edges of bit pulses of the data frame that is to be sent on the basis of a piece of changeover information that the data frame comprises.

Preferably, the changeover of the rise time can be carried out during normal operation of the transceiver and/or of an electronic control unit associated with the transceiver and/or of a bus subscriber associated with the transceiver.

In accordance with a development of the invention, the check for the piece of changeover information on the data frame that is to be sent can preferably be performed by means of a decoder associated with the transceiver, wherein the decoder is designed to output a control signal for changeover, particularly to an output driver associated with the transceiver, when a value of the piece of changeover information is recognized that indicates the changeover that is to be performed.

In accordance with a preferred development of the invention, the check on the data frame that is to be sent, which check is provided by means of the decoder, and the output of the control signal for changeover can be carried out during normal operation of the transceiver and/or of an electronic control unit associated with the transceiver and/or of a bus subscriber associated with the transceiver.

The transceiver according to the invention is expediently designed such that the method according to the invention can be carried out.

In addition, the invention relates to an electronic control unit for a motor vehicle, which electronic control unit has an associated bus controller and an associated transceiver according to the invention and is designed such that the method according to the invention can be carried out.

BRIEF DESCRIPTION OF THE DRAWINGS

Further preferred embodiments will emerge from the description of exemplary embodiments below with reference to figures.

In the basic illustration.

DETAILED DESCRIPTION OF THE PREFERRED EMBODIMENTS

Figure 1:
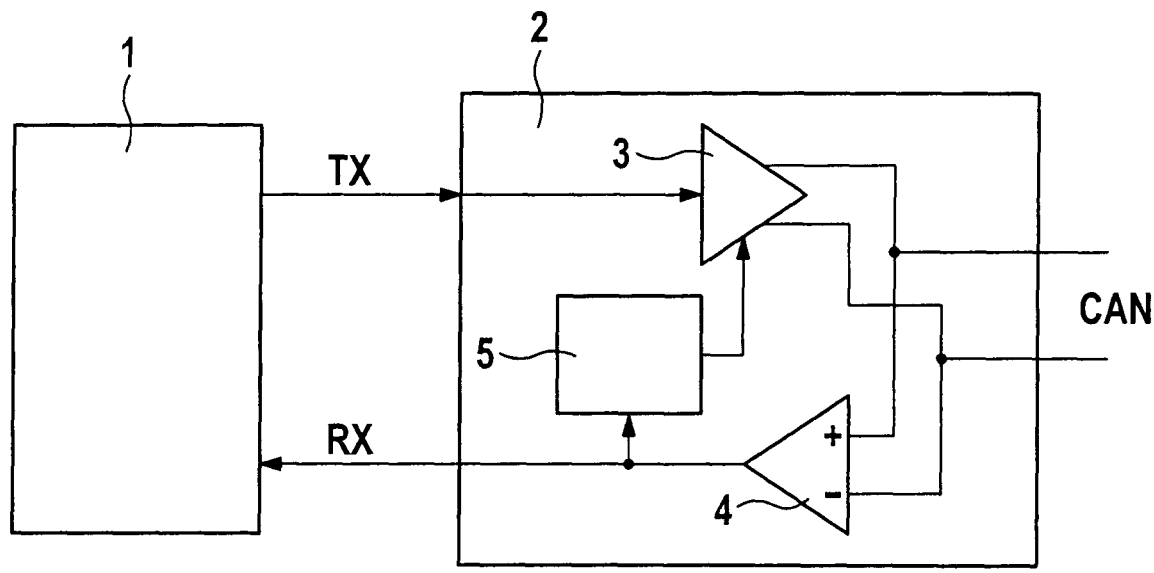
FIG. 1 shows an illustration of an exemplary CAN (FD) controller 1 and CAN (FD) transceiver 2 according to the invention.

FIG. 1 shows an exemplary schematic illustration of a CAN controller 1 and a CAN transceiver 2 that communicate by means of transmission line TX and reception line RX. For the purpose of sending data via data bus CAN, transmission line TX is connected to output driver 3 of transceiver 2. For the purpose of receiving data, reception line RX is connected to receiver 4 of transceiver 2. While output driver 3 is sending data, said data can be read by receiver 4 at the same time in a manner that is known per se, this being used by the CAN controller particularly when sending the identifier in the arbitration phase. Transceiver 2 additionally has decoder 5, which can be used to decode read CAN data frames in a low energy mode of partial networking at least to some extent.

Figure 2:
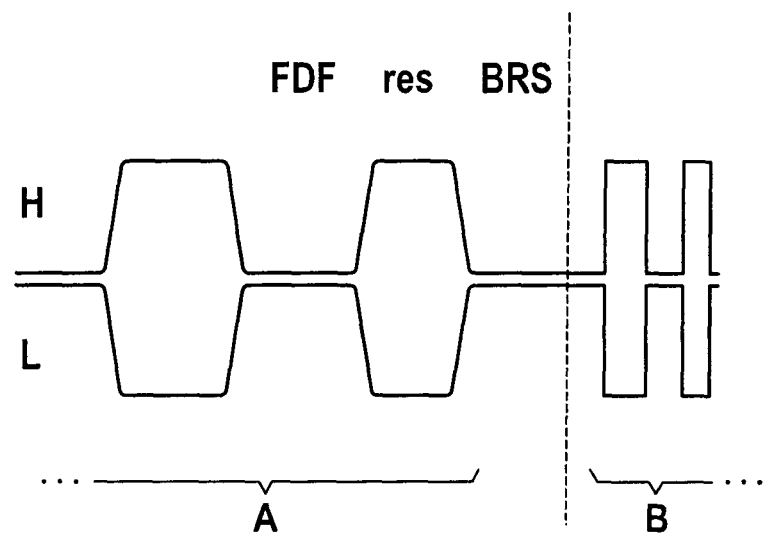
FIG. 2 shows an exemplary timing for a transition from an arbitration phase to a data phase of a CAN-FD data frame within the meaning of the invention.

FIG. 2 shows an exemplary timing for a transition from an arbitration phase to a data phase for a CAN-FD data frame. According to an aspect of the invention, decoder 5 of transceiver 2 detects the BRS ("bit rate switch") bit of the CAN-FD data frame in real time in order to steepen the edges of the output driver in the data phase. In FIG. 2, A represents the bit rate of the arbitration phase and B represents the bit rate of the data phase in this case. As a result, it is possible to keep the radiated emission in the arbitration phase comparatively low and to improve the signal quality of the data phase, which means that an allegedly erroneous data frame is not incorrectly recognized by receiving bus subscribers. Even in a network in which data frames based on CAN2.0B and CAN-FD are used, this means that the steeply rising edges that are unfavourable for the purposes of spurious radiated emission arise only during the data phase of the CAN-FD data frames, and the bit pulses can be correctly decoded by the further bus subscribers.

A crucial aspect for changeover to a shorter rise time for the edges is whether the BRS bit is dominant or recessive. If, according to the exemplary embodiment (and the specification) of FIG. 2, it is recessive then the data rate is increased during the data phase B and decoder 5 outputs a control signal for shortening the rise times of the edges of the outgoing bit pulses to output driver 3. To realize this, the decoder 5—provided for partial networking of a sending bus subscriber can also be used during normal operation. In this case, transceiver 2 uses reception line RX to concomitantly read the data frames that are to be sent. The switch back to the slower data rate and the edge gradient is preferably made at the sampling instant of the CRC limit bit.

Preferably, the transceiver 2 according to an aspect of the invention, which can be operated using partial networking, is configured for carrying out the method according to an aspect of the invention, this being able to be accomplished using an existent SPI interface (serial peripheral bus), for example. Alternatively, provision may be made for the method according to an aspect of the invention to be fundamentally activated, particularly when the reception path is used to read in the data frame currently being sent, or the activation is tied to further conditions. Hence, the edge adjustment can be activated in an application-specific manner, e.g. for particular modes of operation or bit rates.

An aspect of the invention can be realized by means of software or in hardware or by means of a combination of software and hardware

The invention claimed is:

1. A method for transmitting messages in a data bus system, the method comprising:
    transmitting, by a transceiver, messages in a form of data frames over a data bus, the data frames including arbitration phase bits and data phase bits;
    checking, by the transceiver, the arbitration phase bits of the data frames for a piece of changeover information;
    transmitting, by the transceiver, the arbitration phase bits with a first rise time and/or a first edge shape; and
    in response to detecting a presence of a defined value of the piece of changeover information in the arbitration phase bits, transmitting, by the transceiver, the data phase bits with a second rise time and/or a second edge shape,
    wherein the second rise time is less than the first rise time, and the second edge shape is sharper than the first edge shape.

2. The method according to claim 1, wherein, the changeover is performed within the data frame that is to be sent, such that various rise times and/or edge shapes are present in the data frame that is to be sent.

3. The method according to claim 1, characterized in that when a value of the piece of changeover information is present that indicates the changeover that is to be performed, the rise time is shortened and/or the edge shape is changed such that demands on a signal quality and/or radiated emission are met.

4. The method according to claim 1, wherein the data frame that is to be sent comprises a plurality of fields, wherein at least one data field is provided and, when a value of the piece of changeover information is recognized that indicates the changeover that is to be provided, the rise time and/or edge shape is/are changed over for subsequent edges of bit pulses at least for some of the data field.

5. The method according to claim 1, wherein the changeover is performed by a transceiver associated with the bus subscriber.

6. The method according to claim 1, wherein the changeover is carried out during normal operation of the bus subscriber and/or of a transceiver associated with the bus subscriber and/or of an electronic control unit that the bus subscriber comprises.

7. The method according to claim 5, wherein, the data frame that is to be sent is checked for the piece of changeover information by a decoder associated with the transceiver, wherein the decoder outputs a control signal for changeover when a value of the piece of changeover information is recognized that indicates the changeover that is to be provided.

8. The method according to claim 7, wherein, the check on the data frame that is to be sent, which check is provided by the decoder, and the output of the control signal for changeover are carried out during normal operation of the bus subscriber and/or of a transceiver associated with the bus subscriber and/or of an electronic control unit that the bus subscriber comprises.

9. The method according to claim 1, wherein the changeover is effected together with commencement of a phase and/or a field with a relatively high clock rate for the data frame.

10. The method according to claim 1, wherein the piece of changeover information before a phase and/or a field with a relatively high clock rate is represented by at least one bit of the data frame that is to be sent, this being particularly a bit for indicating a bit rate changeover for a CAN-FD protocol.

11. The method according to claim 1, wherein the rise time and/or edge shape of edges of bit pulses of the data frame that is to be sent is/are changed over again when conclusion of a data field or conclusion or commencement of a field subsequent to the data field is recognized.

12. A transceiver for a bus subscriber of a data bus system, the transceiver comprising:
a processor configured to:
transmit messages in a form of data frames via a data bus connecting the bus subscribers of the data bus system, the data frames including arbitration phase bits and data phase bits,
check the arbitration phase bits of the data frames for a piece of changeover information,
transmit the arbitration phase bits with a first rise time and/or a first edge shape, and
in response to detecting a presence of a defined value of the piece of changeover information in the arbitration phase bits, transmit the data phase bits with a second rise time and/or a second edge shape,
wherein the second rise time is less than the first rise time, and the second edge shape is sharper than the first edge shape.

13. The transceiver according to claim 12, wherein the changeover can be carried out during normal operation of the transceiver and/or of an electronic control unit associated with the transceiver and/or of a bus subscriber associated with the transceiver.

14. The transceiver according to claim 12, wherein the check for the piece of changeover information on the data frame that is to be sent can be performed by a decoder associated with the transceiver wherein the decoder is designed to output a control signal for changeover, to an output driver associated with the transceiver, when a value of the piece of changeover information is recognized that indicates the changeover that is to be provided.

15. The transceiver according to claim 14, wherein the check on the data frame that is to be sent, which check is provided by the decoder, and the output of the control signal for changeover can be carried out during normal operation of the transceiver and/or of an electronic control unit associated with the transceiver and/or of a bus subscriber associated with the transceiver.

16. The transceiver according to claim 12, wherein the transceiver is designed such that a method for transmitting messages in the data bus system, wherein the messages can be transmitted in the form of data frames by the data bus and the data frame that is to be sent by a bus subscriber is checked for the piece of changeover information, wherein, changeover of the rise time and/or edge shape of edges of bit pulses of the data frame that is to be sent is performed on the basis of the presence of a defined value of the piece of changeover information.

17. An electronic control unit for a motor vehicle, which electronic control unit has an associated bus controller and an associated transceiver according to claim 16.

18. The method according claim 2, wherein when a value of the piece of changeover information is present that indicates the changeover that is to be performed, the rise time is shortened and/or the edge shape is changed such that demands on a signal quality and/or radiated emission are met.

19. The method according to claim 6, wherein, the data frame that is to be sent is checked for the piece of changeover information by a decoder associated with the transceiver, wherein the decoder outputs a control signal for changeover when a value of the piece of changeover information is recognized that indicates the changeover that is to be provided.

20. The method according to claim 1, wherein the piece of changeover information before a phase and/or a field with a relatively high clock rate is represented by at least one bit of the data frame that is to be sent, this being particularly a bit for indicating a bit rate changeover for a CAN-FD protocol.

21. The transceiver according to claim 13, wherein the check for the piece of changeover information on the data frame that is to be sent can be performed by a decoder associated with the transceiver, wherein the decoder is designed to output a control signal for changeover, to an output driver associated with the transceiver when a value of the piece of changeover information is recognized that indicates the changeover that is to be provided.

* * * * *